US 011790338B2

(12) United States Patent
Tokhtabaev

(10) Patent No.: US 11,790,338 B2
(45) Date of Patent: Oct. 17, 2023

(54) TRANSACTION SYSTEM AND METHOD

(71) Applicant: TEZRO, LLC, Wilmington, DE (US)

(72) Inventor: Tokhir Tokhtabaev, Bradenton, FL (US)

(73) Assignee: TEZRO, LLC, Wilmington, DE (US)

( * ) Notice: Subject to any disclaimer, the term of this patent is extended or adjusted under 35 U.S.C. 154(b) by 0 days.

(21) Appl. No.: 17/650,538

(22) Filed: Feb. 10, 2022

(65) Prior Publication Data

US 2022/0277277 A1 Sep. 1, 2022

Related U.S. Application Data

(60) Provisional application No. 63/147,975, filed on Feb. 10, 2021.

(51) Int. Cl.
*G06Q 20/12* (2012.01)
*G06Q 20/32* (2012.01)

(52) U.S. Cl.
CPC ......... *G06Q 20/12* (2013.01); *G06Q 20/3276* (2013.01)

(58) Field of Classification Search
None
See application file for complete search history.

(56) References Cited

U.S. PATENT DOCUMENTS

| | | |
|---|---|---|
| 2009/0287590 A1 | 11/2009 | Hahn-Carlson |
| 2013/0191213 A1 | 7/2013 | Beck et al. |
| 2013/0290106 A1* | 10/2013 | Bradley ................ G06Q 90/20 705/323 |
| 2015/0324828 A1 | 11/2015 | Ouimet |
| 2017/0287038 A1 | 10/2017 | Krasadakis |
| 2018/0103109 A1* | 4/2018 | Jaladi ...................... H04L 67/02 |
| 2018/0114202 A1 | 4/2018 | Matsas et al. |
| 2021/0090209 A1* | 3/2021 | Appleboim ............. G06T 11/60 |

* cited by examiner

*Primary Examiner* — Joseph W. King
(74) *Attorney, Agent, or Firm* — Shumaker, Loop & Kendrick, LLP; James D. Miller

(57) ABSTRACT

A method of selling a good or service online includes creating a price tagged image including a visualization of the good or service and a visual code including information regarding the good or service and configured to be interacted with by a buyer of the good or service, sharing the price tagged image to an online platform, redirecting a buyer of the good or service to a transaction system provided independently of the online platform following an interaction of the buyer with the visual code corresponding to the good or service based on the information of the visual code, and negotiating a transaction between the buyer and a seller regarding the good or service corresponding to the visual code interacted with by the buyer via use of the transaction system.

11 Claims, 2 Drawing Sheets

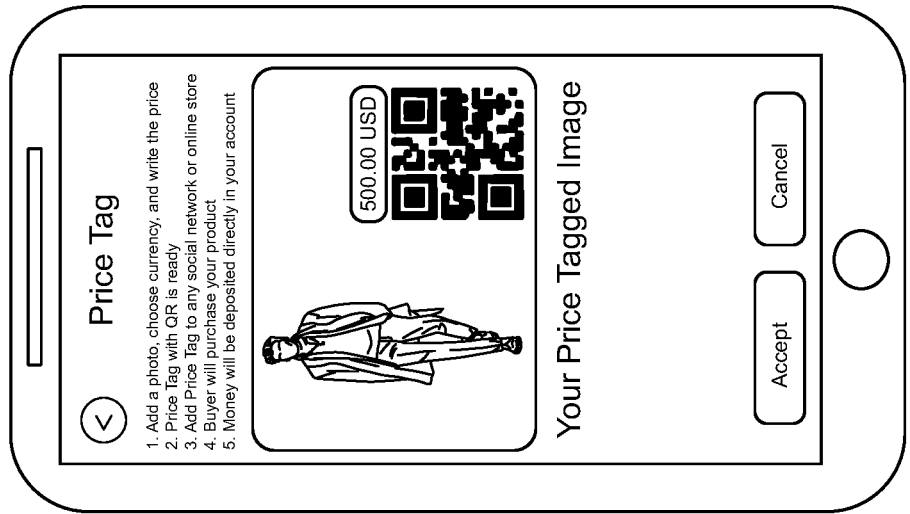
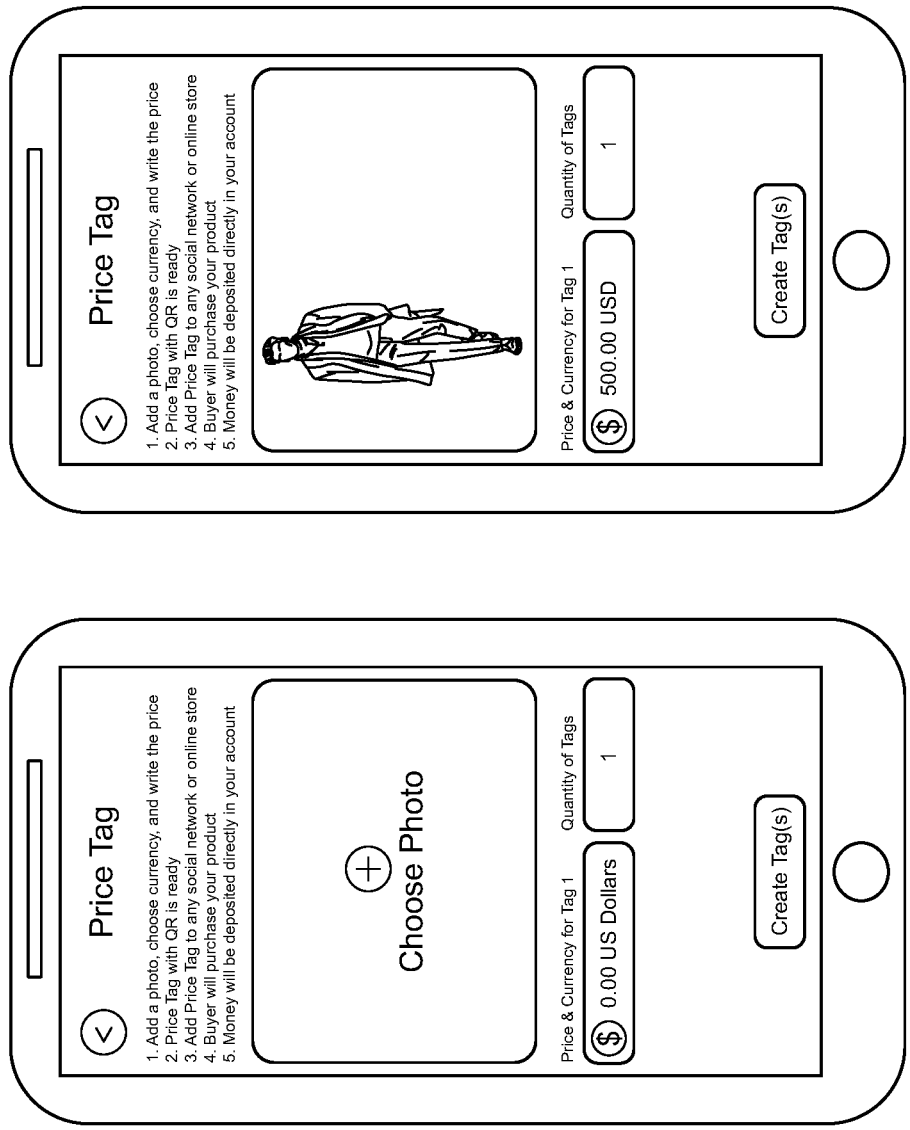

TRANSACTION SYSTEM AND METHOD

CROSS-REFERENCE TO RELATED APPLICATION

This patent application claims priority to U.S. Provisional Patent Application Ser. No. 63/147,975, filed on Feb. 10, 2021, the entire disclosure of which is hereby incorporated herein by reference.

FIELD

The present invention relates generally to a transaction system, and more particularly, a transaction system utilizing blockchain technology for making transactions and securing the terms of such transactions through an escrow feature.

BACKGROUND OF THE INVENTION

There are many circumstances wherein it is desirable to transfer goods, services, or funds quickly and confidently between two or more parties. Such transactions may also be subject to certain terms and conditions that must be met to satisfy all associated parties.

However, many current exchange platforms are not capable of guaranteeing compliance with all such terms and conditions throughout the process of completing such transactions. For example, it is common for payment to be made with respect to goods that are damaged or otherwise not meeting the expectations of the buyer upon receipt thereof. In many circumstances, it is excessively difficult to later resolve such disputes and make all parties whole, thereby leading to situations wherein one or more parties are ultimately dissatisfied.

Blockchain technology allows for the creation of digital encrypted records that can be shared with and hence confirmed by all relevant parties. This sharing of a common ledger of such records renders it difficult, if not impossible, to corrupt such records. As such, the blockchain technology allows for secure digital transactions and contractual relationships to be made with respect to large quantities of parties in a fast and reliable manner.

It is therefore desirable to apply such blockchain technology to a transaction system applicable to various types of transactions in order to guarantee compliance with the terms of the transactions. It is also desirable that such a transaction system maximizes the flexibility of the transactions while also minimizing the complexity and expenses associated with securing the transactions.

It has also become increasingly common for many products to be advertised for sale or otherwise marketed through a variety of different platforms including being made available across multiple online retailers, marketplaces, auction sites, and even social media platforms. One downfall of advertising and selling such products across multiple different platforms relates to the manner in which the buyer often must register with the instantaneous platform in order to actually complete a purchase of a desired product. For example, it may be necessary for the buyer to establish a user name, password, billing address, delivery address, email address, and the like with respect to the instantaneous platform being accessed for the viewing of the product in question in order to finalize a purchase through the platform. Not only is this process time consuming and inconvenient, but it also presents additional security risks to the buyer by constantly requiring such personal information to be entered for each different transaction.

It would therefore also be desirable to provide a transaction system that allows a single transaction system to be utilized for finalizing transactions with respect to products that are advertised or otherwise marketed across a plurality of different online platforms.

SUMMARY OF THE INVENTION

Consistent and consonant with the present invention, an improved transaction system for carrying out secure digital transactions has surprisingly been discovered.

The transaction system includes an interactive webpage or mobile application having an interface allowing communication between account holders for establishing transactions between the account holders and an EOS platform associated with the interactive web page or mobile application. The EOS platform creates tokens to represent each item of value to be transferred via the transactions carried out through the interactive web page or mobile application between the account holders.

According to an embodiment of the present invention, a method of selling a good or service online includes creating a price tagged image including a visualization of the good or service and a visual code including information regarding the good or service and configured to be interacted with by a buyer of the good or service, sharing the price tagged image to an online platform, redirecting a buyer of the good or service to a transaction system provided independently of the online platform following an interaction of the buyer with the visual code corresponding to the good or service based on the information of the visual code, and negotiating a transaction between the buyer and a seller regarding the good or service corresponding to the visual code interacted with by the buyer via use of the transaction system.

According to another embodiment of the present invention, a transaction system comprises an interactive webpage or software application configured to generate a price tagged image, the price tagged image including a visualization of a good or service for sale and a visual code including information regarding the good or service, and negotiate a transaction between a buyer and a seller regarding the good or service associated with the price tagged image. The negotiating of the transaction occurs following an interaction of the buyer with the visual code of the price tagged image when the price tagged image is hosted on an online platform provided independently of the transaction system. The interaction of the buyer with the visual code redirects the buyer to the transaction system for negotiating the transaction based on the information regarding the good or service contained within the visual code.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein:

FIGS. 1-3 show progressive displays of the web page or mobile application used for creating an online price tag according to a price tag feature of the transaction system;

DETAILED DESCRIPTION OF THE INVENTION

Figure 5:
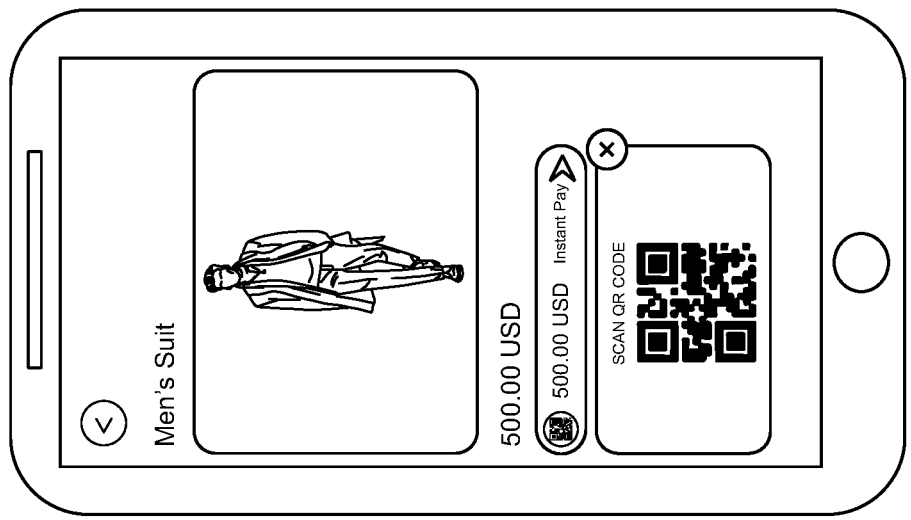
FIGS. 4 and 5 show progressive displays of a third party web page or mobile application used to display goods or services for sale and capable of purchase using the price tag feature of the transaction system.

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical, unless stated otherwise.

The present invention generally relates to a transaction system capable of utilizing blockchain technology for carrying out a variety of different types of transactions. Although certain exemplary transactions are disclosed herein, it should be apparent that the system and methods disclosed herein may be adapted to other related transactions associated with different exchanges, goods, property rights, or services than those specifically described herein. Any examples provided herein regarding the sale or exchange of consumer goods or collectibles may similarly be adapted to apply to various services or other contractual obligations without necessarily departing from the scope of the present invention. As used hereinafter, references to terms such as "products" or "goods" that may be transferred via the transaction system may also be considered to be representative of intangible property, such as intellectual property rights or the rights to other contractual obligations. The present transaction system is accordingly not limited to the sale or transfer of tangible articles of manufacture, and may be adapted to accommodate any form of transaction including any set of terms or obligations without necessarily departing from the scope of the present invention. Such variations are noted herein where applicable, although the listed alternatives should not be considered to be limiting to the scope of the present invention.

The transaction platform or system is provided as a website or a mobile or smart device software application configured to host the transaction process. A user is any person or entity who wishes to participate in a transaction such as an exchange of currency, or a purchase or sale of a product, a service, a property right, a lot, or a part of a lot through use of the transaction system, wherein a "lot" is defined as any valuable item sold via use of the transaction system, including collectibles. An account holder is a user who has established an account through the transaction system with the account having a wallet that reflects the wealth of the account holder in terms of tokens created by the transaction system. An insurance agent is an insurance company that is responsible to insure digital funds that are placed in the system. When an auction process is described, an auction organizer may refer to a trading platform with an algorithm system that uses a standard double non-stop auction with a registering history of all deals, and may be saved in a permanent blockchain.

In one embodiment, the transaction system is based on the technological, decentralized EOS platform, which generally revolves around the use of tokens. Such a system utilizes the Delegated Proof of Collision Algorithm (DPOS), which allows for the handling of millions of users and millions of transactions utilizing blockchain technology. A blockchain represents transactions that users make during use of the transaction system. The system blockchain produces blocks every 3 seconds. Exactly one manufacturer is entitled to produce a block at any given time. If the block is not created at the scheduled time, the block is skipped. Blocks are produced in 21 rounds. At the start of each round, 21 unique block producers are selected. In each round, the top 20 candidates are automatically selected, and the last manufacturer is selected in proportion to the number of votes compared to other manufacturers having access to the system. The selected manufacturers are shuffled using a random number (pseudo-randomness derived from block time). This shuffling ensures that all manufacturers maintain a balanced relationship with all other manufacturers.

The transaction system is configured to perform payments and other internal transactions. A user first creates an account with the transaction system, which establishes an internal digital wallet associated with the account. The user then transfers a desired amount of a crypto currency or fiat currency to the transaction system for placement within the wallet. The transferred amount of the crypto or fiat currency is converted to a corresponding amount of tokens associated specifically with the transaction system. The tokens may be created as internal EOS assets in the same quantity and in the same denomination as the originally transferred crypto or fiat currency. The tokens may be created as a result of the work of internal smart contracts associated with operation of the transaction system.

Transactions carried out through use of the transaction system include the transfer or exchange of the created tokens between the accounts of the different users of the transaction system. The transfer or exchange of these tokens allow the transactions to be performed in a matter of milliseconds without geographic limitations. The transactions are also able to be carried out in the absence of a bank or other intervening financial organization or the like. If an account holder would like to remove currency from the transaction system, the account holder indicates from which account wallet the tokens should be withdrawn and to which external account the tokens should be transferred. The transaction system then writes off the tokens, which are in the form of the EOS assets, of the specified type of currency (crypto or fiat) in the amount specified by the account holder. The corresponding amount of the currency is then credited to the external account as specified by the account holder.

One exemplary use of the transaction system includes a transfer of funds between two different account holders of the transaction system. A first step includes the user establishing an account by transferring the desired crypto or fiat currency to the transaction system. In a second step, the received amount of the associated currency is tokenized in the form of the internal EOS currency assets of the transaction system via blockchain-based methods. In a third step, the transaction system graphically displays the amount of each of the available types of currencies, both crypto and fiat, that have been tokenized and placed within the wallet of the instant account holder for further exchange or transfer to other account holders also using the transaction system. In a fourth step, the instant account holder selects a separate account holder utilizing the transaction system to which the instant account holder would like to transfer funds. The separate account holder may be selected from a list of contacts established by the transaction system with which the instant account holder has a prior relationship. For example, the contact list may be formed via contact requests sent between account holders utilizing the transaction system or may be based on previous transactions having occurred between the different account holders. In a fifth step, the instant account holder selects the amount of each of the desired types of currency that the instant account holder would like to transfer to the separate account holder. The transfer may occur with respect to a chat or private messaging system established by the transaction system for carrying out such private transfers of funds. The selection of the terms of the transaction may be considered a negotiation of the transaction via the transaction system. In a sixth step, the separate account holder receives the funds that have been selected for transfer from the instant account holder. The separate account holder may also be prompted to accept the transfer to ensure all parties agree to the terms of the transfer.

The example established above may be representative of one account holder paying back another account holder in a quick and seamless manner, such as when one of the account holders is paying a fair share of a purchase executed exclusively by the other of the account holders. Such an example may be representative of two account holders splitting the costs of a meal or similar expense when it is easier for only one of the account holders to make the associated payment at a given time with the expectation of later reimbursement, or the like.

A graphical interface that may be associated with a web page or mobile application used to carry out the functions of the transaction system as described herein may include a wallet menu for display to the instant account holder of the transaction system. The wallet menu may include visual indications of the types of currencies available through use of the transaction system with each of the different currencies named and separated in list form. One list may include the available crypto currencies and another distinct list may include the available fiat currencies. Each currency entry includes the currency name, an exchange rate of the currency to another currency (such as US dollars), the amount of the currency the account holder instantaneously has in the wallet with respect to the currency (for example, the number of bitcoins), and the currency sum equivalent in another currency (such as US dollars). It should be apparent that other exchange rate formats and exchange equivalents may be used in addition to US dollars, such as euros or the like.

A chat send money menu for display to the instant account holder of the transaction system may also be implemented, and may be utilized in performing certain negotiations regarding a specific transaction. The chat send money menu includes visual indications of the secondary account holder being communicated with through the transaction system, any written messages for discussing a transfer that have been sent, and any messages indicating a transfer of funds that has previously occurred. The chat send money menu accordingly includes a record of prior discussions and transfers that have occurred between the relevant parties. The chat send money menu may also include an interactive portion for carrying out a transfer of funds to the selected account holder. The interactive portion displays the selected type of currency, the currency equivalent in another form of currency, and the balance of the instant account holder from which the current transfer is to be drawn. The amount of the money to be transferred may be selected via a number pad having numbered indicia and the like for entering the desired amount to be sent to the other account holder. The instant account holder can accordingly initiate a chat session with another separate account holder via such a contact list and then optionally discuss a potential transfer of funds. The instant account holder can then input the amount of the desired currency to be transferred and then approve of the transfer to the separate account holder.

The transaction system is also well suited for performing escrow functions with regards to various different types of transfers between different account holders of the transaction system. The escrow feature may be utilized as a term of the negotiated transaction performed via the transaction system. The transaction system allows the associated funds to be transferred with respect to a desired transaction to be blocked via blockchain technology and maintained by the transaction system. The blocked funds are then able to be locked in a manner ensuring that all parties to the desired transaction comply with all of the terms and conditions subject to the transaction before releasing the funds to the associated parties. This escrow feature of the transaction system guarantees that all terms and conditions are able to be followed with respect to various different types of transactions including the payment of currency for goods and services, currency transfers, and the buying and selling of goods at auction, as non-limiting examples.

For example, a user of the transaction system may be a potential buyer of a good and may agree to pay a negotiated payment for the good. The buyer can then block these funds using blockchain technology, such as converting the funds to the tokens utilized by the transaction system, that are initially locked via the blocking of the funds. The user can maintain this lock on the funds through the blocking thereof via the transaction system until all terms and conditions are met with respect to the transaction, which may include receipt of the good in question following a period of time necessary for delivery of the good, as one example.

In the example of the funds being locked until receipt by the buyer following delivery initiated by the seller, the buyer may be issued a unique code by the transaction system for use in confirming the receipt of the delivered good, such as a QR-code, bar code, or the like. The buyer may scan or enter this code back into the transaction system upon receipt of the good as a manner of confirming that the transaction has occurred and all terms and conditions have been satisfied. The entry of this code then releases the lock on the funds such that the funds are transferred to the seller of the good via the transaction system. In this way, both parties can be satisfied that all terms and conditions were met with respect to the transaction before closing the transaction. The blockchain technology used by the transaction system records all of the relevant data associated with the transaction such as the sale price, any terms and conditions subject to the sale, and the time of entry of the code indicating delivery of the good to the buyer, and the resulting status of the transaction, such as indicating that the transaction is closed upon delivery of the good and the release of the associated funds to the seller, which occurs upon removal of the fund lock. The transaction system accordingly provides a thorough record of the transaction for later referral by either of the parties, as needed. The use of blockchain also ensures that this record is maintained and unable to be manipulated.

Upon any potential disagreements or failures to meet all such terms and conditions agreed upon by all parties, the transaction system may be utilized to prevent an undesired transfer of the locked funds. For example, the buyer may be dissatisfied with the quality or condition of the received good. The buyer can then contact the transaction system to record this dissatisfaction and failure of the seller to meet all related terms and conditions. A distribution box is opened and the authenticity of all documents or other agreements reached between the parties to the transaction are verified by an administrator of the transaction system. The system administrator returns the locked funds to the buyer rather than releasing the funds to the seller, whereby the funds are transferred back to the wallet associated with the account of the buyer. Thus, the escrow feature of the transaction system does not allow for the manipulation of the parties to the transaction.

One potential transaction for use with the escrow feature may be the exchange of different currencies between different account holders, such as the example described above. The exchange process may include a buyer requesting a certain amount of another form of currency in exchange for currency included in the wallet of the buyer. The buyer may make the request via an entry into the transaction system requesting the desired amount of the needed currency in exchange for currency held by the buyer in the wallet of the buyer, with the amount to be exchanged locked. The lock is only opened for releasing the funds when the corresponding counterparty enters exactly the requested amount of currency in accordance with the request of the original buyer, thereby satisfying the terms of the original request. The entry of the exact requested amount releases the lock and the two different currencies are exchanged via the transaction system according to the agreement between the two parties. If a different amount is offered by the counterparty, the funds will not be unlocked and released as a result of the disparity in the terms between the parties. As stated above, the negotiations and resulting terms and conditions subject to such exchanges can be recorded via the blockchain to ensure compliance therewith.

A use of the transaction system with respect to the above described currency exchange process may occur as follows. Assuming an account has already been created with funds included within the wallet of the associated user, a first step includes the user creating an exchange request. A second step includes the request being stored in a secure blockchain associated with the transaction system. A third step includes the display of such requests in a display menu. Each request may include information such as the name of the account holder making the request and amount of currency desired. A fourth step includes another separate account holder selecting one of the requests as listed on the request menu. A fifth step includes the separate account holder entering an amount of a currency offered in exchange for the selected request, which may be representative of a negotiation carried out with respect to the transaction via the transaction system. The offered amount goes to an escrow account maintained by the transaction system with the offered amount locked. In a sixth step, the amounts offered by each of the parties are unlocked and released only upon agreement between the two parties in accordance with the request and the offer matching each other. A chat window as described above may be utilized in order to negotiate such an exchange.

A use of the transaction system with respect to a purchase of a good while utilizing the described escrow feature may occur as follows. Again assuming the establishment of an account with funds in the associated wallet, a first step includes the account holder acting as the buyer of the transaction finding a desired product as listed for sale in an associated menu or list provided by the transaction system. In a second step, the buyer of the product selects the exchange function having the escrow feature. In a third step, the buyer of the product and the seller may optionally communicate regarding the sale of the product, which may constitute a negotiation of the transaction performed via the transaction system. In a fourth step, the seller may initiate the delivery of the product to the buyer. In a fifth step, the buyer of the product enters or scans a special code indicating receipt of the delivered product (assuming completion of delivery), thereby establishing that all terms and conditions have been met. Any funds locked regarding the purchase of the product are then unlocked and released to the seller.

The transaction system may also be configured for performing auctions or similar bidding processes acting as transaction negotiating means. The transaction system may utilize a double non-stop auction, where clients' requests are met with maximum similarity of price during a selling or a purchasing of a lot. A double non-stop auction is a process of buying and selling goods with multiple sellers and multiple buyers. Requests can be made by sellers as well as buyers. Potential buyers submit their bids and potential sellers submit their asking prices to the system. If both prices of a buyer and seller are the same, then the deal will be closed. The system according to the invention allows individuals to purchase a part in a valuable collectable item such as antique pieces, art, precious jewelry, and the like, for example. An owner of each item that has the item in their possession has an opportunity to generate a profit due to an increase in the value of the item. At the same time, part owners of the item have an opportunity to make a profit if the item sells at a higher price to another individual.

The system is built in a way that allows all the lots to be numbered and saved/recorded in a blockchain. The lots may then be insured by an insurance broker. Anyone can take part in public auctions and can purchase a complete lot or parts of it. One can also resell or track a desired lot in the blockchain, which prevents others from changing or breaking into the records. An insurance certificate can be purchased, which will guarantee a safety of an investment in the lot or part thereof. Whether a lot is sold in full or can be sold partially is determined by the seller. A lot that is sold in full may be delivered to the new owner via courier as a standard procedure.

An auction process as may be performed by the transaction system may occur as follows, wherein EOS assets in the form of tokens are used to represent the value of each lot or each discrete part of a divided lot. In a first step, a seller having an account with the transaction system puts up a lot for auction via the transaction system. In a second step, the lot may optionally be verified by an insurance broker for authenticity (or valuation or the like) prior to being posted for review on the transaction system, as necessary with respect to the terms of the corresponding transaction. In a third step, a value of the lot is established and digitized into the EOS assets in the form of the tokens. In a fourth step, the lot is placed for auction via an appropriate listing on the transaction system, whereby the lot is available for inspection and bids via interested parties. In a fifth step, a buyer can purchase the lot or whatever parts of the lot are up for auction. The purchase of the lot may include the transfer of a corresponding number of the tokens from the wallet of the buyer to the wallet of the seller in similar fashion to that described hereinabove. The buyer of a lot or part thereof receives a blockchain certificate and tokens representing the item purchased. A more thorough description of the auction process performed by the transaction system of the present invention is included in U.S. Pat. Appl. Pub. No. 2021/0398110 A1 to Tokhtabaev, the entire content of which is hereby incorporated herein by reference.

The purchase of the lot may also include use of the previously described escrow feature wherein any funds allocated for the purchase of the lot (or parts thereof) may be locked via recordation in an associated blockchain until all parties to the transaction have satisfied all associated terms and conditions related to the transfer of the lot. For example, if the entirety of the lot is sold and in need of physical delivery to the buyer from the seller as a result of an auction, the funds used to purchase the lot may be locked until such delivery is complete and the associated code indicating successful delivery has been entered into the transaction system in accordance with the method disclosed above.

Additionally, the escrow feature may also be utilized when determining the authenticity or value of an item placed for auction. The funds associated with the sale may be locked until authentication is complete. For example, use of the escrow feature may allow for the conducting of an auction prior to the completion of a corresponding authentication/valuation process with respect to the lot in question, wherein completion of such authentication/valuation is associated with completing the terms of the auction process. Any funds associated with the auction and awaiting transfer between the associated parties may accordingly be held until such authentication/valuation is complete, thereby allowing the bidding process to precede the verification process with respect to the lot. One skilled in the art should appreciate that alternative contractual relationships may be conceived of which similarly must be completed prior to the transfer of funds, as desired, while remaining within the scope of the present invention.

The lot or part of the lot associated with the auction process may be resold with an associated profit (if applicable) collected upon completion of the purchase by the buyer. Upon such a resale, a transfer of the agreed upon funds to the seller of the lot or the part of the lot may occur. As previously described, the escrow feature may once again render the transfer of such funds as contingent on the completion of all agreed upon terms and conditions.

The transaction system may generate a profit by subjecting the described transactions to various fees. For example, a percentage of each transfer of funds may be applied as a fee to be paid to the transaction system. Fixed fees may also be utilized, as desired.

Another potential use of the transaction system includes the use of external social networks or online marketplaces to place a good or service for sale without requiring the eventual buyer to have a specific relationship with the instantaneous social network or online marketplace. This aspect of the transaction system allows the buyer to initiate a purchase of the good or service placed for sale on the corresponding social network or online marketplace without the buyer having to have an account or special permissions from the social network or online marketplace, thereby relieving the buyer from having to manage or maintain the security and access to additional online accounts. For example, many social networks allow guests to view photographs or posts of certain users of the social network without requiring the guest to sign in or otherwise have an associated account with the corresponding social network. The transaction system accordingly allows the guest to perform transactions through browsing of the associated social network (or online marketplace) without requiring the guest to provide personal information or the like with the social network in exchange for the ability to access such features. The transaction system is advantageously adaptable for use with any number of social networks or online marketplaces having the ability to share or otherwise display an image as set forth hereinafter, which greatly improves the versatility of the transaction system. This aspect of the transaction system may be referred to as a "price tag" feature thereof due to the manner in which the transaction system generates an online price tag for each associated good or service that can be accessed by and interacted with by users of the associated social network or online marketplace.

In a first step, the prospective seller opens the corresponding web page or software application corresponding to the transaction system and selects the price tag feature as one of the possible features offered by the transaction system. The accessing of the transaction system may be accomplishing using a mobile or smart device having a graphical interface and the ability to communicate with external computing devices, such as by wireless communication protocols. The mobile or smart device may further include a camera for the creation of images corresponding to a good or service for sale. The mobile or smart device may include any form of user interface configured to allow the corresponding user to interact with the content displayed on the graphical interface, including the use of a touch screen interface. The mobile or smart device may also utilize alternative user interfaces, including external devices such as a mouse, keyboard, or the like. As used hereinafter, it should be understood that interactions by a user with the transaction system or with a corresponding third party online platform are accomplished via a corresponding interaction of the user with the user interface of the mobile or smart device, including touching the graphical interface as a specified position, clicking on a specified position via a cursor overlaying the graphical interface, or using key entries, as non-limiting examples, so long as the user is able to navigate the transaction system for accomplishing the tasks described herein. The user of the transaction system interacting therewith may accordingly refer to graphical interface being updated in appearance, a communication of data to or from the transaction system, or a combination thereof. The smart device is shown as having the general configuration of smart phone or tablet in the provided figures, but may refer to any smart device having the described capabilities while remaining within the scope of the present invention.

In a second step, the seller selects the image or photograph associated with the good or service being advertised for sale by the price tag. If carried out using a smart device, the second step may include uploading an image saved to a memory of the smart device or the second step may include using a camera of the smart device to take a photograph representative of the corresponding good or service. In a third step, the seller selects the desired type of currency (among fiat currencies, crypto currencies, and the like) and amount of the currency (price) to be associated with the good or service. In a fourth step, the transaction system generates the image having the visualization of the good or service as well as the price tag displayed therein, and further allows for the image to be downloaded by the seller or otherwise accessible to be shared by the seller via a link provided through another social network or online marketplace.

FIGS. 1-3 illustrate subsequent configurations of the display of the web page or mobile application associated with the transaction system that may be used to generate one of the price tags according to the second through fourth steps outlined above. As shown in FIG. 1, the display may initially include a brief description of the process, an indicium for adding a photo or image representative of the good(s) or service(s) for sale, a payment entry area having indicia for selecting a type of currency and a value of the currency representative of the price of the good(s) or service(s) for sale, an indicium for selecting the number of (price) tags to be associated with the photo or image representative of the good(s) or service(s) for sale, and an indicium corresponding to the creation of one or more of the price tags in accordance with the other selections made by the seller. The number of tags may be greater than one when a photo or image shows two or more products for sale therein, such as when a model is wearing multiple different clothing items that are all for sale through a specific seller. However, the present example includes only a single price tag for the sake of simplicity.

FIG. 2 illustrates the same display as FIG. 1 following the selection of a photograph/image related to the good(s) or service(s) for sale. In the present example, an image of a model wearing an outfit comprising various articles of clothing is shown. The selection of only one price tag may correspond to the sale price of the entire outfit or any one article of clothing, as desired. Although not shown, the transaction system may also include indicia for entering additional information regarding each of the price tags for the purpose of further identifying the good or service that is being offered for sale. For example, if multiple price tags are selected to be associated with the selected image, each of the price tags may correspond to a different article of clothing shown in the image, hence further identification of the good(s) or service(s) associated with each of the independently provided price tags may be necessary. Each price and currency selection may accordingly be accompanied by additional information, such as a title for the good or service being offered, that can also be included in the price tag for identification purposes.

In the present example, the seller has selected U.S. dollars as the currency and $500 as the sale price, which corresponds to a cost of the entire outfit. Once the "Create Tag(s)" indicium is selected, a visual code is generated for each of the good(s) or service(s) identified as being associated with one of the price tags. In the present example, the visual code is a QR-code, and only the single QR-code is generated regarding the single price of $500.00. As shown in FIG. 3, the price tag is shown as being displayed over a portion of the selected image in order to show the relevant contents of the image as well as the visual code and associated price. The price tag may also be added to a position surrounding or adjacent the selected image, as desired, so long as the price tag is shown in conjunction with the relevant content of the image regarding the good or product for sale. The price tag of the present invention includes a visualization of at least the visual code associated with the corresponding good or service, and may optionally include the price (as shown) of the good or service with respect to any number or type of currencies, and may further optionally include the additional information regarding the good or service discussed above (such as a brief title referring to the good or service, or other similar identifying statement or information).

As shown in the example of FIG. 3, the QR-code and the corresponding price information form the price tag associated with the good(s) or service(s) for sale, and this price tag can be seen when another user of the corresponding social network or online marketplace views the price tagged photograph/image of the good(s) or service(s) for sale as uploaded by the seller. The price tag feature of the transaction system accordingly allows for the creation of an image having a visualization of a good or service and a visualization of a price tag associated with the good or service displayed thereon (or adjacent thereto), wherein both the visualization of the good or service and the price tag are visible to an observer of the image when shown on a corresponding social network or online marketplace.

The transaction system may allow for the placement of the price tag over the image at a location specified by the seller in order to provide additional information regarding the good or service to which the instantaneous price tag is referring. For example, the inclusion of multiple different price tags with respect to the image shown in FIGS. 2 and 3 may include each of the different price tags overlaying a different one of the articles of clothing worn by the model, thereby visually indicating the good associated with each individually provided price tag.

Referring back to the summary of the process of executing the price tag feature of the transaction system, in a fifth step, the seller selects a social network or online marketplace to share the price tagged image to for viewing by a prospective buyer. This may occur following the acceptance of the substantially contemporaneously created price tagged image, such as is shown in FIG. 3. The sharing of the price tagged image may include the seller accessing the desired social network or online marketplace and then uploading the generated price tagged image, or the sharing may include the selection of the desired social network or online marketplace via the transaction system for the communication of the price tagged image to the corresponding selection, as may be initiated by a sharing feature of the transaction system. It should be apparent that any method of providing visual access to the price tagged image via a corresponding web page or software application allows for the data contained within the QR-code of the price tag to be seen/scanned and interpreted by known methods, hence the provided examples are non-limiting.

In a sixth step, a buyer browses the corresponding social network or online marketplace and the buyer scans (or otherwise selects and decodes) the QR-code shown on the price tagged image to indicate that the buyer has interest in purchasing the good or service. The scanning of the QR-code may include the buyer scanning the QR-code as displayed on another display screen, such as that of another mobile or smart device, as desired. In other embodiments, the instantaneous mobile or smart device may be configured to redirect the web browser or software application in response to an on-screen selection of the price tag as viewed on a display screen of the corresponding smart device, thereby eliminating the need for an additional and external smart device having a code scanning capability. In still other embodiments, the mobile or smart device or an associated software application associated therewith may be configured to search for and decode any QR-codes (or other visual codes) found within a buyer-selected image (which may include a screenshot of the instantaneous display of the smart device when viewing a social network or online marketplace displaying price tagged images), which then allows the buyer to select a price tag among those discovered in the image. However, any method of selecting and decoding the information carried within the QR-code may be utilized without departing from the scope of the present invention, so long as the QR-code redirects the buyer to the desired good or service following the selection thereof. The selection of the QR-code may refer to any typical interaction with the corresponding mobile or smart device indicative of the selection of an indicium or the like on the display screen/graphical display/user interface of the mobile or smart device as mentioned hereinabove. Additionally, the present invention is not limited to QR-codes, but may be used with any type of visual code or visual system capable of being scanned or otherwise selected and decoded for determining information regarding the good or service without departing from the scope of the present invention. For example, a bar code may be used in place of the described QR-code. References to a QR-code herein are accordingly interchangeable with any corresponding visual code capable of storing information regarding the sale of the good or service in accordance with the present disclosure, including information regarding the redirecting of a web browser or software application to a desired web address or site.

The selection of the QR-code may cause the web browser or software application being used to find and select the price tagged image to redirect the buyer to a specific web address, or may transfer the buyer to a software application associated with the transaction system. The selection of the QR-code may further prompt first time users of the transaction system to establish an account with the transaction system to aid in carrying out the purchase of the selected good or service, where applicable. Once the transaction system is accessed by the buyer following the selection of the QR-code, the transaction system will open a payment window where the buyer can select a currency and amount thereof for paying the seller according to the terms of the seller. However, the transaction system may alternatively utilize any type of interface for facilitating a negotiation of the terms of the transaction between the buyer and the seller while remaining within the scope of the present invention. It should also be understood that a negotiation as carried out once the transaction system is accessed (following selection of a good or service within a price tagged image) may refer to the discussion or agreement to any terms or conditions regarding the transaction, including the buyer agreeing to the provided terms and conditions absent any form of counter proposal or the like. In other words, the term negotiate may refer to the acceptance of terms and conditions absent further discussion thereof. The purchase of the good or service results in the agreed upon purchase price being transferred from the wallet of the buyer to the wallet of the seller via the transaction system. The transaction does not require the participation of the social network or online marketplace originally hosting the price tagged image selected by the buyer.

The payment of the buyer to the seller may also include the use of the escrow system as described hereinabove for ensuring full compliance with all terms of such transactions carried out using the transaction system. The operation of the escrow feature may be the same as that described in any of the examples provided hereinabove regarding those steps described as following the selection of a good or service to be purchased by a buyer. That is, although different methods of finding and initiating a transaction are disclosed, the escrow feature may operate according to the steps described above once a buyer has initiated a transaction with a seller via an interaction with a price tagged image, including the potential ability to negotiate the terms of the transaction.

The escrow system may operate as follows with respect to the following example wherein a good is purchased and in need of delivery as well as a review of quality before all terms of the agreement are met. Following a negotiation or agreement facilitated via the transaction system, the buyer selects to send the payment from escrow and the transaction system blocks the funds sent to the seller to place a lock on the funds until all terms of the agreement are met. The seller cannot access the funds until the delivery is completed and the quality of the good is assessed and approved by the buyer. The seller can then send the good by any means, such as a delivery service offering tracking capabilities, and can send an update to the buyer via the transaction system that the good has been delivered and will soon be ready to be received and assessed for quality. If the buyer agrees that the good has sufficient quality, such as by actively approving of the good or failing to object to the quality of the good within an agreed upon timeframe, the transaction is complete and the funds are released for access by the seller. However, if the buyer does not approve of the quality of the good, the buyer can object and facilitate the return of the good to the seller and a refund of the locked funds set aside for the seller.

The objection may include the buyer submitting evidence regarding the state or quality of the good in question upon the assessment of the good. The objection may include the buyer preparing a video file and submitting the file within a given timeframe, such as 48 hours from delivery of the good, to establish the poor quality of the good (among other possible concerns including the shipping of the incorrect good), as one non-limiting example. If the buyer objects while unable to provide sufficient evidence to support the objection, the funds will be unlocked and sent to the seller as it is assumed that all terms of the agreement were met by the absence of the evidence establishing a proper objection or refusal. The transaction system may utilize AI/ML technologies, which can be used in a judicial proceeding to establish the facts surrounding a specific transaction.

Figure 4:
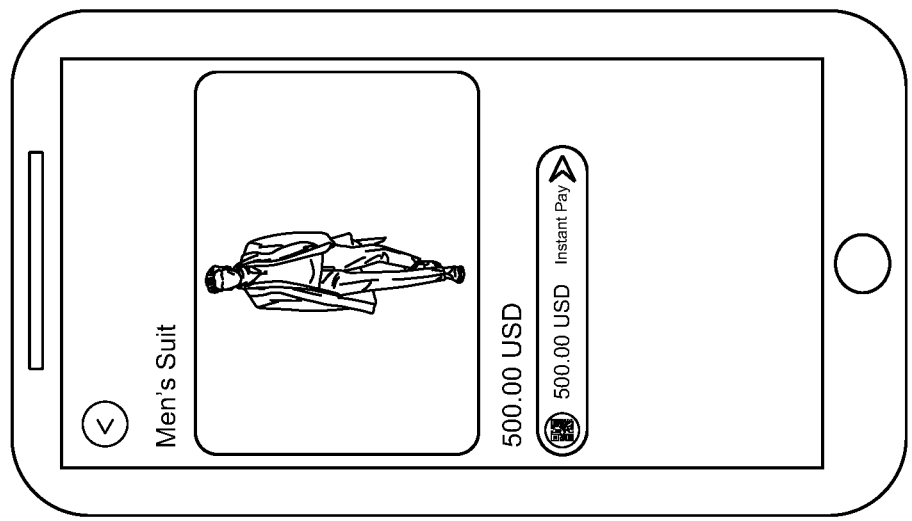

FIGS. 4 and 5 illustrate another implementation of the price tag feature of the transaction system that may be utilized with respect to an online marketplace or other external shopping platform. In this implementation, the creation of the price tag does not necessarily include the creation of an image having the QR-code of the price tag visually identifiable on or adjacent the good(s) or service(s) being displayed in the image. Instead, the creation of the price tag may include the data regarding the price tag being accessible via interaction with a payment feature of the transaction system, which may alternatively be referred to as a price tag payment widget associated with the transaction system. The payment feature allows for access to the QR-code associated with the corresponding price tag via an interaction of a buyer with the online marketplace or shopping platform, as opposed to merely viewing the QR-code directly within the image being displayed with respect to a corresponding good or service.

A method of using the described payment feature of the transaction system with respect to an external shopping platform may include the following steps. In a first step, the buyer accesses the external shopping platform via a corresponding web browser or smart device software application and selects (via touch, click, voice command, etc.) a desired good or class of goods to access a display such as is disclosed in FIG. 4. The display includes a payment button (indicium) allowing the buyer to access the price tag feature of the transaction system. The payment button may include the ability to illustrate the QR-code and price associated with the good or service for sale such that the transaction system may be accessed in similar fashion to that described above. For example, as shown in FIG. 5, a user interaction with the payment button may include the generation of an image of the QR-code corresponding to the price tag associated with the advertised image, such as clicking on a specified portion of the button resembling the QR-code or hovering a selection means over the button, as non-limiting examples. This enlarged QR-code is then able to be scanned by an external device or otherwise detected by the instantaneous smart device (or a corresponding software application) in accordance with the method described above.

In a second step, the buyer scans or otherwise interacts with the QR-code based payment button to cause the transaction system to redirect the browser or software application of the buyer to a payment display for entering information regarding the completion of the instantaneous sale. The payment display may include indicia for adding a new address for delivery of the good, selecting one of the previously utilized addresses, selecting a desired currency and amount thereof for purchasing the good or service, and for confirming the terms of the transaction. In a third step, the buyer fills out the necessary fields on the payment display. If the escrow feature is utilized, a fourth step includes the buyer selecting the escrow feature for completing the transaction. In a fifth step, the seller sends the purchased good to the buyer at the desired address as selected in the third step. In a sixth step, the buyer confirms or objects to the quality of the received good via use of the disclosed escrow feature, such as by making one of the video files discussed earlier. Assuming the quality is approved, a seventh step includes the transaction system unlocking the blocked funds of the buyer. An eighth step includes the funds that are unlocked being released to the account (wallet) of the seller to complete the transaction.

The payment feature used in conjunction with the price tag feature operates substantially the same as the examples including a visual code added directly to the price tagged image, but allows for the image to be provided in the absence of the QR-code thereover. Instead, the buyer can determine if the enlarged QR-code is displayed when the buyer determines that the payment feature is desired. The division of the image and the QR-code of the price tag when using the payment feature allows the good or service being sold to be placed for sale on an online marketplace having alternative methods of payment offered as well. That is, the use of the illustrated payment button for displaying the QR-code may be only one of a variety of different payment options offered by the corresponding online marketplace.

The price tag feature according to the present invention beneficially allows for an interaction with a visual code associated with the desired good or service in order to redirect all transactions to the disclosed transaction system, as opposed to requiring independent login credentials with respect to each different social network or online marketplace accessible by the buyer. This accessibility of the visual code via display of the code within an image also allows for a single price tagged image to serve as a sales mechanism with respect to multiple different sales platforms absent the need to specify the terms of sale with respect to each independent platform. For example, a single price tagged image may be shared to any number of different social networks or online marketplaces in a manner wherein the QR-code of the corresponding price tag is accessible for scanning/selection in some form with respect to each of the different sales platform. Such an example may include the same image being visually accessible to the public with respect to each of the different sales platforms associated with the price tagged image in a manner wherein only visual access to such images is required to initiate the redirecting of the browser or software application to the transaction system for completing the desired transaction. Specifically, celebrities, business entities, or the like typically have publicly accessible social media platforms such that the general public can access certain content absent a login or need for the sharing of personal data. The price tagged image may be shared in such a manner to facilitate increased interaction with the corresponding good or service.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of selling a good or service online comprising the steps of:
creating a price tagged image, by a seller, via use of a first smart device, the price tagged image including a visualization of the good or service and a visual code including information regarding the good or service, the visual code configured to be interacted with by a buyer of the good or service via use of a second smart device;
sharing the price tagged image to an online platform, by the seller, via use of the first smart device, wherein the price tagged image is configured to be visible to the buyer during navigation of the online platform;
interacting with the visual code of the price tagged image, by the buyer, via use of the second smart device, the interacting with the visual code including one of:
scanning the visual code using a camera of the second smart device when the visual code is visibly displayed on a graphical interface of a third smart device during navigation of the online platform via the third smart device, or
detecting a presence of the visual code being visibly displayed on a graphical interface of the second smart device during navigation of the online platform via the second smart device and prompting the buyer to select the visual code following detection thereof;
redirecting an application executing on the second smart device to a web address managed by a payment transaction system provided independently of the online platform in response to the interacting of the buyer with the visual code via use of the second smart device, wherein the redirecting of the application to the web address is based on the information of the visual code and an analysis of the information of the visual code via the second smart device, and wherein the web address is associated with a user interface of the payment transaction system; and
negotiating a transaction between the buyer and a seller regarding the good or service corresponding to the visual code interacted with by the buyer following the redirecting of the second smart device to the user interface of the payment transaction system, the negotiating of the transaction occurring via communications occurring between the first smart device and the second smart device as facilitated by the payment transaction system independently of the online platform to which the price tagged image is shared.

2. The method of claim 1, wherein the visual code is a QR-code or bar code.

3. The method of claim 1, wherein the visual code is displayed over or adjacent the visualization of the good or service associated therewith.

4. The method of claim 1, wherein the online platform is a social network or an online marketplace.

5. The method of claim 1, wherein the price tagged image is visible to the buyer when navigating the online platform prior to the buyer providing login credentials to the online platform.

6. The method of claim 1, wherein the method includes the sale of a plurality of goods and/or services, wherein each of the plurality of goods and/or services is visualized in the same price tagged image.

7. The method of claim 6, wherein each of the plurality of the goods and/or services is associated with an independently created visual code including information regarding the corresponding one of the plurality of the goods and/or or services.

8. The method of claim 1, further including a step of locking funds associated with the transaction until all terms and conditions negotiated with respect to the transaction are completed.

9. The method of claim 8, wherein the funds from the buyer to the seller are locked until the buyer confirms receipt of the good or service.

10. The method of claim 8, wherein the funds from the buyer to the seller remain locked when the buyer provides evidence that all terms and conditions negotiated with respect to the transaction have not been completed.

11. The method of claim 10, wherein the funds from the buyer to the seller remain locked when the buyer provides a photograph or video showing a lack of compliance with the terms and conditions negotiated with respect to the transaction.

\* \* \* \* \*